United States Patent [19]

Brand et al.

[11] Patent Number: 4,822,171

[45] Date of Patent: Apr. 18, 1989

[54] METHOD AND APPARATUS FOR MEASURING THE WALL THICKNESS OF TRANSPARENT OBJECTS

[75] Inventors: Bernhard Brand, Niederwerrn; Bruno Richter, Stegaurach, both of Fed. Rep. of Germany

[73] Assignee: Dipl.-Ing.Bruno Richter GmbH & Co., Fed. Rep. of Germany

[21] Appl. No.: 824,158

[22] Filed: Jan. 30, 1986

[30] Foreign Application Priority Data

Jan. 30, 1985 [DE] Fed. Rep. of Germany ....... 3503086

[51] Int. Cl.$^4$ ............................................. G01B 11/06
[52] U.S. Cl. .................................................... 356/382
[58] Field of Search ................. 250/201 AF; 356/381, 356/382, 445

[56] References Cited

U.S. PATENT DOCUMENTS

| 1,756,785 | 4/1930 | Gallasch | 356/382 |
| 2,998,745 | 9/1961 | McClellan | 356/382 |
| 3,137,756 | 6/1964 | Gunther et al. | 356/381 |
| 3,307,446 | 3/1967 | Rottmann | 356/445 |
| 3,807,870 | 4/1974 | Kalman | 356/382 |
| 4,447,717 | 5/1984 | Nohda | 250/201 AF |

FOREIGN PATENT DOCUMENTS

| 1813847 | 7/1969 | Fed. Rep. of Germany | 356/382 |
| 39022 | 3/1980 | Japan | 356/382 |
| 93003 | 7/1980 | Japan | 356/382 |
| 216904 | 12/1983 | Japan | 356/382 |
| 897740 | 5/1962 | United Kingdom | 356/382 |

Primary Examiner—Richard A. Rosenberger
Attorney, Agent, or Firm—Fishman, Dionne & Cantor

[57] ABSTRACT

A method and apparatus for measuring the wall thickness of transparent objects, such as glass tubes, is presented wherein a narrow band (beam) of light is projected onto a surface of the object at an angle other than 90°; and the beams reflected by the adjacent boundary surface of the object and that boundary surface thereof which is spaced behind that adjacent boundary surface by the distance to be measured are focused onto the image plane of a receiver. A movable deflecting element is provided in the optical path between the light source and the image plane of the receiver. The lines of intersection between the band of light and the boundary surfaces of the layer to be measured (the lines of intersection being represented by bands of light on the image plane of the receiver), are then moved or urged by the deflecting element in the direction in which they are spaced apart. Signals are generated by the receiver in response to the appearance of first and second bands of light at a predetermined location on the image plane of the receiver. Next, the interval of time between the signals is measured to determine the wall thickness of the transparent object. An important feature of the present invention is that two measuring surfaces are provided in the image plane of the receiver which adjoin along a boundary line, the boundary line being at right angles to the direction of movement of the two bands of light.

17 Claims, 3 Drawing Sheets

METHOD AND APPARATUS FOR MEASURING THE WALL THICKNESS OF TRANSPARENT OBJECTS

BACKGROUND OF THE INVENTION

This invention relates to a method and apparatus for measuring the wall thickness of transparent objects, such as glass tubes.

In accordance with well known prior art techniques, the wall thickness of transparent objects (i.e., glass tubes) have been determined using a method wherein a narrow band of light is projected onto a surface of a transparent object at an angle other than 90°; and the beams reflected by the adjacent boundary surface of the object and that boundary surface thereof which is spaced behind that adjacent boundary surface by the distance to be measured are focussed onto the image plane of a receiver. A movable deflecting element is provided in the optical path between the light source and the image plane of the receiver. The lines of intersection between the band of light and the boundary surfaces of the layer to be measured (which lines of intersection are represented by bands of light on the image plane of the receiver), are moved by the deflecting element in the direction in which they are spaced apart. Signals are then generated by the receiver in response to the appearance of first and second bands of light at a predetermined location on the image plane of the receiver; and the interval of time between the signals is measured to determine the wall thickness of the transparent object.

Methods of the general type described above are known in the art. An example of such a prior art method for measuring the wall thickness of transparent objects is disclosed in Published German Application No. 18 03 285.

Those light beams which can be produced by presently available light sources, and the associated image-forming means, are very sharply defined and permit a projection of images consisting of narrow bands of light of high sharpness and high intensity. However, the reflection on the adjacent boundary surface of the object to be examined, and on that boundary surface thereof which is disposed behind the adjacent boundary surface at the distance to be measured, results in the formation of reflected beams of reduced sharpness and of irregular shape because the boundary surfaces of the object to be examined may have corresponding irregularities. As a result, it is difficult to achieve an accurate measurement. For this reason, the images which are formed by the narrow bands of light in the image plane of the receiver have reduced sharpness, variations in strength and differences in intensity. These problems are particularly prevalent in beams which have been reflected by the adjacent boundary surface of the object; and by that boundary surface thereof which is spaced behind that adjacent surface by the distance to be measured.

It will be appreciated that the above-described reduced sharpness, strength variation and intensity difference of the reflected beams, on the projected image of the narrow bands of light on the receiver adversely affect the accuracy of the measurement. In order to avoid such adverse effects, a measurement is taken of the interval of time from the occurrence of the center or the peak value of a first output signal generated by the receiver in response to the projection of a first image of the narrow band of light on the receiver, and the occurrence of the center or peak value of a second signal produced by the receiver in response to the projection of a second reflected image of the narrow band of light.

The above described measuring technique is disclosed in aforementioned Published German Application No. 18 03 285 wherein a mean or average of two measured intervals of times is calculated, the first of which is the interval of time between the times at which the first and second signals rise above a predetermined threshold value; and the second interval of time is the interval between the times at which the first and second output signals of the receiver decrease below that threshold value.

In practice, however, the generation of the signals which represent the intervals of time in the prior art method (of German Application No. 18 03 285) requires a multiple differentiation of signals from the receivers. This may give rise to certain problems, particularly if the images of the narrow band formed on the receiver by projection or otherwise are blurred or streaky as a result of irregularities of the reflecting surfaces of the object to be examined leading to secondary peaks appearing in the resulting output signals produced by the receiver. Moreover, the reflection of the beam derived from the image that has been projected on the second reflecting surface, which is disposed behind the adjacent boundary surface, will result in a considerable loss in intensity of the second reflected image formed on the receiver by the narrow band of light. As a result, the output signal of the receiver will be correspondingly weakened.

From German Patent Specification No. 23 25 457, it is also known to provide, at the location of the receiver, a linear array of detectors, which are spaced a preselected distance from each other; and to direct a beam of light on the object to be examined so that the beam of light is reflected by the adjacent boundary surface of the article and by that boundary surface thereof which is spaced below the adjacent boundary surface by the distance to be measured. The reflected beams are incident on different detectors, and the distance between the detectors in the array can be determined by consecutively sampling the detectors of the array.

In that prior art method (German Specification No. 23 23457), the accuracy of measurement is limited by the pitch of the detectors of the array and by the resolution provided by them; and it is difficult to provide for a plurality of distinct measuring ranges.

SUMMARY OF THE INVENTION

The above described and other problems and deficiencies of the prior art are overcome or alleviated by the measuring method and apparatus of the present invention. In accordance with the present invention, a measuring method of the general type of measuring method describe above is provided wherein improved and more accurately defined measurement results can be obtained which are independent of irregularities of the reflecting surfaces of the transparent object. Moreover, these improved results are obtained with a measuring apparatus having a relatively simple design and construction which is therefore less susceptible to undesired interference.

The present invention utilizes a method of measuring the wall thickness of transparent objects, such as glass tubes, wherein a narrow band (beam) of light is projected onto a surface of the object at an angle other than 90°; and the beams reflected by the adjacent boundary surface of the object and that boundary surface thereof which is spaced behind that adjacent boundary surface by the distance to be measured are focussed onto the image plane of a receiver. A movable deflecting element is provided in the optical path between the light source and the image plane of the receiver. The lines of intersection between the band of light and the boundary surfaces of the layer to be measured (the lines of intersection being represented by bands of light on the image plane of the receiver), are then moved or urged by the deflecting element in the direction in which they are spaced apart. Signals are generated by the receiver in response to the appearance of first and second bands of light at a predetermined location on the image plane of the receiver. Next, the interval of time between the signals is measured to determine the wall thickness of the transparent object.

An important feature of the present invention is that two measuring surfaces are provided in the image plane of the receiver which adjoin along a boundary line, the boundary line being at right angles to the direction of movement of the two bands of light. The light fluxes which are incident on the respective measuring surfaces can be separately measured. During the movement of the two bands of light over the image plane of the receiver, the first band of light delivers equal light fluxes to both measuring surfaces at a first time and the second band of light delivers equal light fluxes to both measuring surfaces at a second time. As a result, the wall thickness of the transparent object (which is to be measured), is determined from the interval of time between output signals generated by the receiver to indicate the first and second times.

It will be appreciated that two measuring elements are provided in the image plane of the receiver of the apparatus of the present invention; and that both of the measuring elements are required to generate respective signals. One of the signals is generated by the receiver in response to the image produced on the receiver by the beam that has been reflected by the adjacent boundary surface of the object to be measured; and the other of the signals is generated in response to the image produced on the receiver by the beam that has been reflected by that boundary surface of the object which is disposed below the adjacent boundary surface thereof. The light flux which is incident on one measuring surface can now be compared with the light flux that is incident on other measuring surface. That comparison is utilized for a determination of the interval of time between the times at which the centers of the two reflected beams appear.

When a beam or fan of rays is disposed in a plane and is reflected on the outside surface of a glass tube and on the inside surface of a glass tube (the inside surface being spaced from the outside surface by the thickness to be measured), the reflected beams will produce arcuately curved traces in an image-forming plane. For this reason, a preferred feature of the measuring system of the present invention is that the boundary line between the measuring surfaces in the image plane of the receiver is also curved and has substantially the same curvature as the light bands in the image plane.

In a preferred embodiment of the present invention, the interval of time between the movement of the center of the cross-section of one reflected beam and the movement of the center of the cross-section of the other reflected beam past the receiver (in other words the distance between the two reflecting boundary surfaces of the transparent object), is determined by using one corresponding signal from the receiver to activate a counter, and the other signal from the receiver is used to deactivate the counter. Using a know technique (such as described in German Patent Specification No. 28 49 252) the counter is supplied with pulses from a pulse generator having a pulse repetition frequency which is controlled by a phase control loop in dependence on the instantaneous velocity of the image that is projected onto the receiver and/or in dependence on the velocity of the movable deflecting means.

The above-discussed features and advantages of the present invention will be apparent to and understood from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
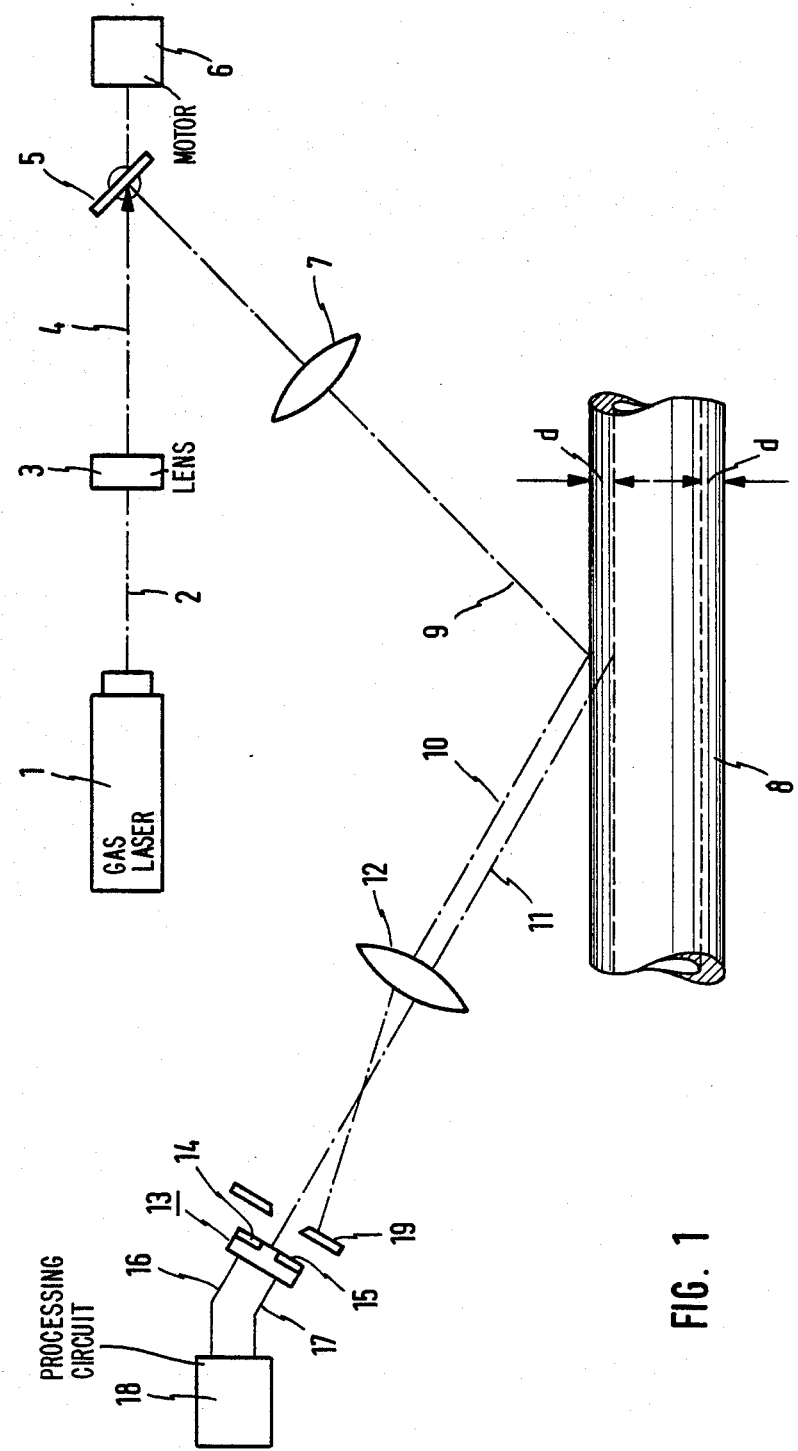
FIG. 1 is a diagrammatic side elevation view showing an apparatus for measuring the wall thickness of transparent objects in accordance with the present invention.

The gas laser shown generally at 1 in FIG. 1 produces a sharply focussed light beam 2, which is transformed by a cylindrical lens 3 into a fan of rays 4 extending in a plane that is normal to the paper plane of the drawing. The fan of rays 4 is incident on a rotating mirror 5, which is rotated by a drive motor 6. The bandlike beam is produced by a collimating lens 7 and is incident on the transparent object to be examined which is shown generally at 8. In this case, object 8 consists of a glass tube, of which the wall thickness "d" is to be measured.

Beam 9 is incident on the cylindrical outside surface of the glass tube 8 and is first reflected as a beam 10 and, due to the cylindrical reflecting surface of the glass tube, is changed in cross-sectional shape so that beam 10 will form a trace in the form of an arcuate band of light on a screen which has been introduced into the light path.

Beam 9 also passes through the wall of glass tube 8 and is incident on the cylindrical inside surface of that tube. Beam 9 is then reflected back into the glass wall and emerges as a beam 11 from the outside surface of the glass tube. Because of the reflection of the cylindrical surfaces of the glass tube 8, beam 11 is so deformed that an image of its cross-section on a screen is arcuate and approximately parallel to the image of the beam 10 adjacent to its center of symmetry.

Using an image-forming lens 12, beams 10 and 11 are focussed onto the image plane of a receiver 13, which has two measuring surfaces 14 and 15. Measuring surfaces 14 and 15 are separated or spaced by a narrow boundary line. Separate signals generated by measuring surfaces 14 and 15, in response to the light fluxes incident thereon, are delivered by respective lines 16 and 17 to a processing circuit 18.

In the light path of beams 10 and 11, receiver 13 is preceded by a slit stop 19, in which the slit extends at right angles to the paper plane of FIG. 1. Slit 19 ensures that while each of the beams 10 and 11 can be incident on one or the other or both of the measuring surfaces 14 and 15 of receiver 13, the beams 10 and 11 cannot be incident on the receiver 13 at the same time. For this purpose, the width of the slit of the slit stop 19 is smaller than the smallest distances to be expected between the images formed by beams 10 and 11 in the image plane of receiver 13. Because this distance depends upon the wall thickness of the transparent object to be examined, it may be suitable to provide for an adjustment of the width of the slit of the slit stop 19.

Figure 2:
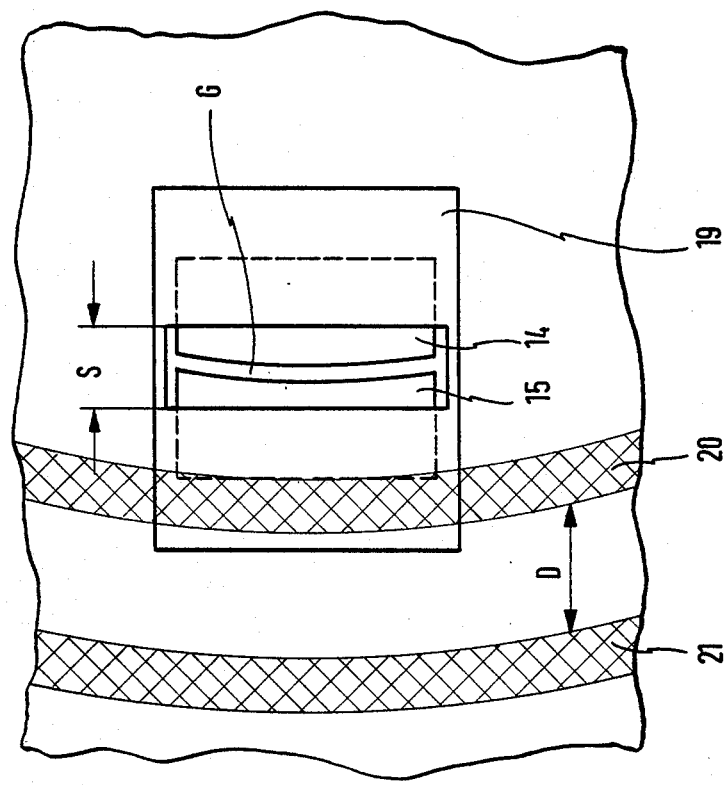
FIG. 2 is an enlarged diagrammatic elevation view of the front portion of a receiver used in the measuring apparatus of FIG. 1.

In FIG. 2, the width of the slit of slit stop 19 is designated "S". Width "S" is smaller than the distance D between the bands of light 20 and 21 (which have been produced by the beams 10 and 11 and appear in the plane of the receiver 13). It is apparent from FIG. 2 that the measuring surfaces 14 and 15 adjoin at a narrow boundary line "G", which is approximately parallel to the bands of light 20 and 21. As a result, receiver 13 will deliver signals of the same magnitude via the lines 16 and 17 to the processing circuit 18 at the times at wherein the respective centers of the cross-sections of beams 10 and 11 move over the boundary line G as a result of the movement of the rotating mirror 5. It should be understood that the term "center" means the center of the dimension of the cross-section of the beam in the direction of movement.

Measuring surfaces 14 and 15 may be formed by the light-sensitive receiving surfaces of a double photodiode and these receiving surfaces may adjoin along a boundary line and be provided on a chip.

Figure 3:
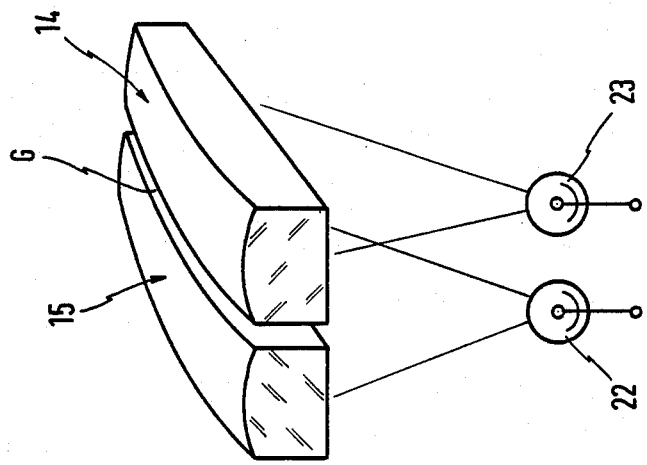
FIG. 3 is a diagrammatic perspective view showing a receiver which is adapted for a use in a measuring apparatus shown in FIG. 1 and as a modification of FIG. 2.

In the modified embodiment shown in FIG. 3, the measuring surfaces (also identified as 14 and 15) may be defined by the entrance apertures of respective strip lenses, which adjoin along a boundary "G" and which constitute field lenses. Light fluxes, which are incident on the strip lenses, are then delivered to separate photocells 22 and 23. It will be appreciated that photocells 22 and 23 may be connected to the lines 16 and 17. As in the boundary line shown in FIG. 2, the boundary "G" of FIG. 3 may also be curved in accordance with the curvature of the bands of light 20 and 21.

In alternative embodiments (not shown), the field lenses shown in FIG. 3 are replaced by prisms or mirrors which, on their entrance side, form separate measuring surfaces as entrance apertures for the beams; and on their exit side, direct the separate beams to separate light-sensitive elements.

Figure 4:
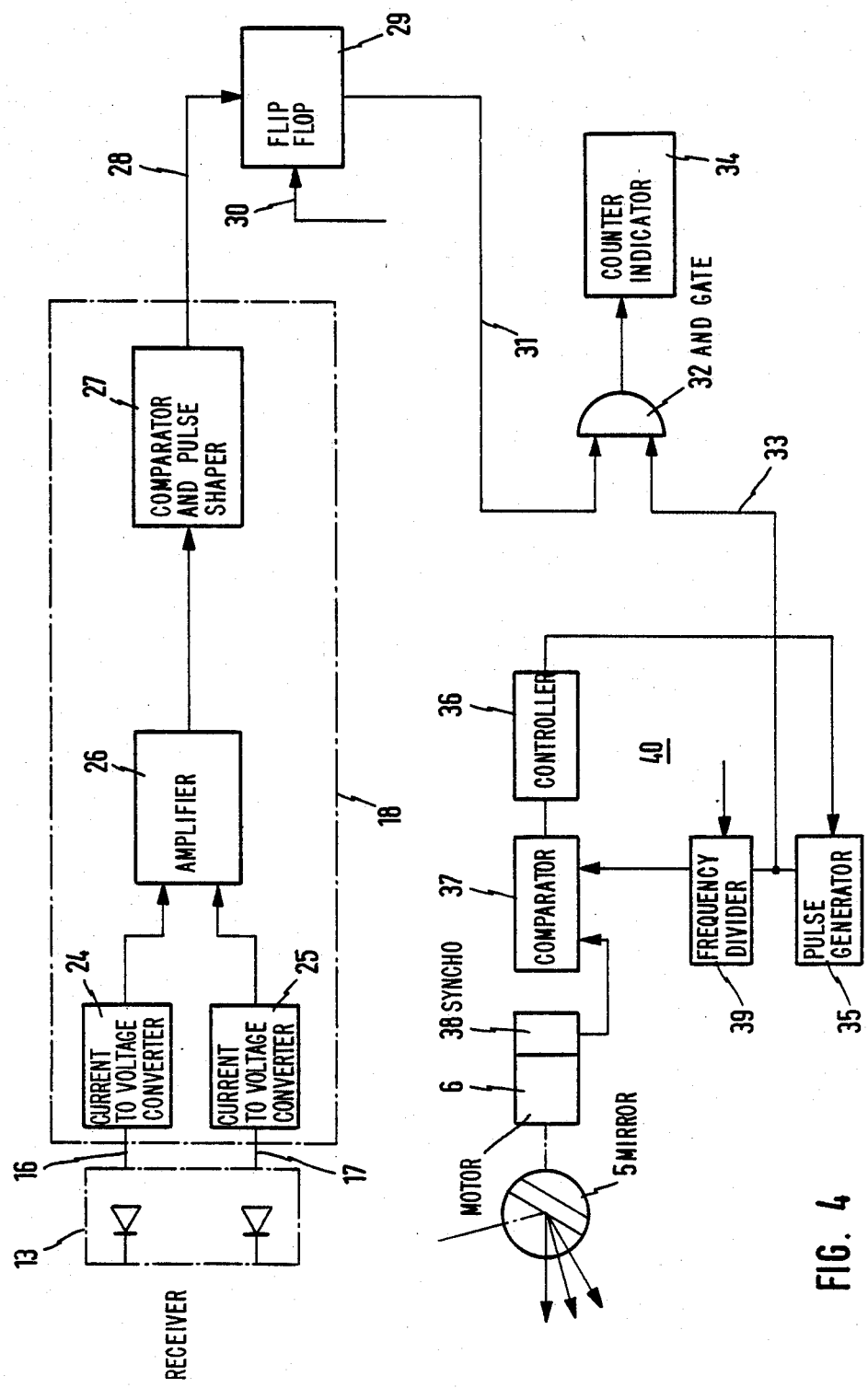
FIG. 4 is a simplified block circuit diagram showing the processing circuit which is connected to the receiver of the measuring apparatus of FIG. 1.

A description of an example of an electronic assembly which may be used in accordance with the present invention now follows. The receiver 13 shown in FIG. 4 comprises two photodiodes, which are connected by lines 16 and 17 to current-to-voltage converters 24 and 25, which on their output side are connected to a differential amplifier 26, which is provided with a zero stabilizer. The output side of the differential amplifier 26 is connected to a comparator and pulse shaper 27. The differential amplifier 26 and the comparator 27 cooperate such that a control signal will appear on the output line 28 of the comparator and pulse shaper 27 when the signals on lines 16 and 17 assume the same magnitude, within certain limits. This will take place when one of the bands of light 20 and 21 is bisected by the boundary line between the measuring surfaces 14 and 15 of the receiver 13. The control signals in line 28 are delivered to a flip-flop 29, which receives from a line 30 a synchronization-initiating signal, which may be taken from suitable pick-ups associated with the drive means for the rotating mirror 5 or from a photocell on which the light beam 4 deflected by the rotating mirror 5 is incident to excite the photocell.

Finally, flip-flop 29 delivers, on its output line 31, a gate control signal, which is on one level when one of the beams reflected by the surfaces of the object to be examined is incident at the center of the receiver 13, and which is on the other level when the other of the beams reflected by the object to be examined is incident on the center of receiver 13 during the rotation of the rotating mirror.

The gate control signal is delivered via line 31 to an AND gate 32. In dependence on the signal level on the line 31, countable pulses received by the AND gate 32 are delivered via the line 33 to a counter-indicator 34.

The countable pulses are generated by a pulse generator 35 at a pulse repetition frequency which is adjustable by a controller 36. The controller 36 is adjusted by a phase comparator 37, which receives signals from a small-pitch syncho 38; which is coupled to a drive motor 6 for the rotary mirror 5 and receives additional input signals from an adjustable frequency divider 39. Frequency divider 39 receives countable signals from the pulse generator 35. That circuitry constitutes a phase control loop 40, which ensures that countable pulses will be delivered by the pulse generator 35 via the AND gate 32 to the counter-indicator 34 at a rate which precisely matches the velocity of the rotating mirror 5.

The beam reflected by the rotating mirror 5 will not move over the collimating lens 7 at a constant velocity. Simple geometrical considerations show that this beam moves faster over marginal portions of the collimating lenses than over its central region. If the pulse frequency of the pulse generator 35 depends strictly on the velocity of the rotating mirror 5 under the control of the frequency control loop 40, the geometrical relations just referred to will introduce into the measurement an error depending on the wall thickness "d" of the glass tube 8 or other transparent object to be examined.

As is known per se from German Patent Specification No. 28 49 252, that error can be compensated whereby the setting of the frequency divider 39 may be corrected by a series of correcting signals when the beam reflected by the rotating mirror 5 is moving along the collimating lens 7. Such correcting signals are read from a memory. The reading of the correcting signals from the memory is initiated by a starting signal, which is generated by suitable means in response to the detection of a predetermined position of the rotating mirror. Details of such an arrangement are not shown on the drawing.

It will be appreciated that the resolution and accuracy of measurement of a measuring apparatus of the type disclosed herein does not depend on the pitch of an array consisting of a plurality of measuring elements; and that the determination of the center of the band of light moving over the receiver does not depend on a single or multiple differentiation of rising edges of pulses. As a result, there will be no transients caused by interference or by imperfections of the projected bands of light; and no errors can be introduced into the measured value by such transients.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of measuring the wall thickness of a transparent object comprising the steps of:

projecting a narrow beam of light from a light source onto an outer surface of a transparent object at an angle other than 90°, said transparent objecting having a first boundary surface adjacent said outer surface and having a second boundary surface which is spaced from the first boundary surface by the distance to be measured;

focusing the beams reflected by said first and second boundary surfaces of the object onto the image plane of receiver means;

providing a movable deflecting element in the optical path between the light source and the image plane of said receiver means;

moving the lines of intersection between the beam of light and the first and second surfaces of the object to be measured by said deflecting element in the direction in which the first and second surfaces are spaced apart wherein the lines of intersection are represented by beams of light on the image plane of said receiver means;

generating signals from said receiver means in response to the appearance of a pair of light beams at a predetermined location on the image plane of said receiver means;

measuring the interval of time between said signals to determine the wall thickness whereby two measuring surfaces are provided in the image plane of said receiver means, said measuring surfaces adjoining along a boundary line, said boundary line being at right angles to the direction of movement of the two beams of light;

separately measuring the light fluxes which are incident on the respective measuring surfaces, wherein during the movement of the two beams of light over the image plane of said receiver means, the first beam of light delivers equal light fluxes to both measuring surfaces at a first time and the second beam of light delivers equal light fluxes to both measuring surfaces at a second time;

determining the wall thickness of the transparent object from the interval of time between output signals generated by said receiver means and indicated by the first and second times; and wherein said two reflected beams of light have curved cross-sections and including the further step of;

providing a boundary line between the measuring surfaces wherein said boundary line has the same curvature as the images of the beams of light on the image plane of the receiver means.

2. A method according to claim 1 including the step of:

determining the distance traveled by the bands of light in the image plane of the receiver between the said first and second times by a counting of pulses which are a generated at a frequency which is controlled by control circuits to be proportional to the velocity of the movable deflecting elements or proportional to the instantaneous velocity of the movement of the bands of light on the image plane of the receiver means.

3. A method according to claim 1 including the step of:

determining the distance traveled by the bands of light in the image plane of the receiver between the said first and second times by a counting of pulses which are a generated at a frequency which is controlled by control circuits to be proportional to the velocity of the movable deflecting elements or proportional to the instantaneous velocity of the movement of the bands of light on the image plane of the receiver means.

4. A method of measuring the wall thickness of a transparent object comprising the steps of:

projecting a narrow beam of light from a light source onto an outer surface of a transparent object at an angle other than 90°, said transparent object having a first boundary surface adjacent said outer surface and having a second boundary surface which is spaced from the first boundary surface by the distance to be measured;

focusing the beams reflected by said first and second boundary surfaces of the object onto the image plane of receiver means;

providing a movable deflecting element in the optical path between the light source and the image plane of said receiver means;

moving the lines of intersection between the beam of light and the first and second surfaces of the object to be measured by said deflecting element in the direction in which the first and second surfaces are spaced apart wherein the lines of intersection are represented by beams of light on the image plane of said receiver means;

generating signals from said receiver means in response to the appearance of a pair of light beams at a predetermined location on the image plane of said receiver means;

measuring the interval of time between said signals to determine the wall thickness whereby two measuring surfaces are provided in the image plane of said receiver means, said measuring surfaces adjoining along a boundary line, said boundary line being at right angles to the direction of movement of the two beams of light;

separately measuring the light fluxes which are incident on the respective measuring surfaces, wherein during the movement of the two beams of light over the image plane of said receiver means, the first beam of light delivers equal light fluxes to both measuring surfaces at a first time and the second beam of light delivers equal light fluxes to both measuring surfaces at a second time;

determining the wall thickness of the transparent object from the interval of time between output signals generated by said receiver means and indicated by the first and second times; and wherein said two reflected beams of light have curved cross-sections and including the step of:

transmitting said two reflected beams through or over correcting optical elements whereby in the light path behind the correcting elements the reflected beams provide a preselected cross-section wherein the images of the bands of light in the image plane of the receiver means are straight and parallel to the boundary line.

5. A method according to claim 4 including the step of:
   determining the distance traveled by the bands of light in the image plane of the receiver between the said first and second times by a counting of pulses which are a generated at a frequency which is controlled by control circuits to be proportional to the velocity of the movable deflecting elements or proportional to the instantaneous velocity of the movement of the bands of light on the image plane of the receiver means.

6. An apparatus for measuring the wall thickness of a transparent object comprising:
   light source means for generating a beam of radiation;
   projecting means for projecting a narrow beam of light onto an outer surface of a transparent object at an angle other than 90°;
   receiving means for receiving beams of light which are formed by the reflection of the beam of light from a first boundary surface adjacent said outer surface and a second boundary surface which is spaced from the first boundary surface by the distance to be measured;
   said receiving means also receiving a formation of images of the lines of intersection between the beam of light and the first and second boundary surfaces;
   processing circuit means for determining the interval of time between output signals generated by said receiver means in response to the appearance of the two beams of light at a predetermined location on the receiver means, said processing circuit means including a comparator circuit;
   wherein said receiver means further comprises;
   two measuring surfaces, each surface including two separate spaced photocells, said photo cells being separated along a boundary line (G), said boundary line extending on the image plane of the receiver means transversely to the direction of movement of the beams of light whereby output signals measured from said two measuring surfaces are adapted to be compared by said comparator circuit of said processing circuit and wherein the wall thickness of the transparent object is determined by a determination of the interval of time from the output signal generated by the comparator at a first time to the output signal generated by the comparator at a second time;
   said measuring surfaces of said receiver means being comprised of light-sensitive surfaces of a double photodiode, said surfaces being provided on a chip and said surfaces adjoining a boundary line; and
   the beams of light received by said receiving means having curved cross-sections and wherein said boundary line (G) between said measuring surfaces having the same curvature as the light beams on the image plane of said receiver means.

7. Apparatus according to claim 6 wherein:
   said receiver means is preceded in the light path by a slit stop, said slit stop having a slit, said slit having a preselected width so that said slit stop vignettes in the image plane of said receiver means an area which has a width that is smaller than the largest expected distance between the two light beams on the image plane of said receiver means.

8. The apparatus according to claim 6 wherein:
   said measuring surfaces of said receiver means are comprised of light-sensitive surfaces of a double photodiode, said surfaces being provided on a chip and said surfaces adjoining a boundary line.

9. Apparatus according to claim 8 wherein:
   said receiver means is preceded in the light path by a slit stop, said slit stop having a slit, said slit having a preselected width wherein said slit stop vignettes in the image plane of said receiver means an area which has a width that is smaller than the largest expected distance between the two light beams on the image plane of said receiver means.

10. The apparatus according to claim 6 wherein:
    said measuring surfaces are formed by the entrance apertures of strip lenses which adjoin along a boundary line (G), said strip lenses acting as field lenses and the light fluxes transmitted through said field lenses being focussed by said field lenses onto said two separate photocells.

11. Apparatus according to claim 10 wherein:
    said receiver means is preceded in the light path by a slit stop, said slit stop having a slit, said slit having a preselected width so that said slit stop vignettes in the image plane of said receiver means an area which has a width that is smaller than the largest expected distance between the two light beams on the image plane of said receiver means.

12. The apparatus according to claim 6 wherein:
    said measuring surfaces are comprised of the entrance surfaces of optical prisms or mirrors which adjoin along a boundary line so that the light fluxes incident on said prisms or mirrors are directed by said prisms or mirrors onto said two separate photocells.

13. Apparatus according to claim 12 wherein:
    said receiver means is preceded in the light path by a slit stop, said slit stop having a slit, said slit having a preselected width so that said slit stop vignettes in the image plane of said receiver means an area which has a width that is smaller than the largest expected distance between the two light beams on the image plane of said receiver means.

14. An apparatus for measuring the wall thickness of a transparent object comprising:
    light source means for generating a beam of radiation;
    projecting means for projecting a narrow beam of light onto an outer surface of a transparent object at an angle other than 90°;
    receiving means for receiving beams of light which are formed by the reflection of the beam of light from a first boundary surface adjacent said outer surface and a second boundary surface which is spaced from the first boundary surface by the distance to be measured;
    said receiving means also receiving a formation of images of the lines of intersection between the beam of light and the first and second boundary surfaces;
    processing circuit means for determining the interval of time between output signals generated by said receiver means in response to the appearance of the two beams of light at a predetermined location on the receiver means, said processing circuit means including a comparator circuit;
    wherein said receiver means further comprises;
    two measuring surfaces, each surface including two separate spaced photocells, said photo cells being separated along a boundary line (G), said boundary line extending on the image plane of the receiver means transversely to the direction of movement of the beams of light whereby output signals measured from said two measuring surfaces are adapted to be compared by said comparator circuit of said processing circuit and wherein the wall thickness of the transparent object is determined by a determination of the interval of time from the output signal generated by the comparator at a first time to the output signal generated by the comparator at a second time;

said measuring surfaces being formed by the entrance apertures of strip lenses which adjoin along a boundary line (G), said strip lenses acting as field lenses and the light fluxes transmitted through said field lenses being focussed by said field lenses onto said two separate photocells;

the beams of light received by said receiving means having curved cross-sections and wherein said boundary line (G) between said measuring surfaces has the same curvature as the light beams on the image plane of said receiver means.

15. Apparatus according to claim 14 wherein:

said receiver means is preceded in the light path by a slit stop, said slit stop having a slit, said slit having a preselected width so that said slit stop vignettes in the image plane of said receiver means an area which has a width that is smaller than the largest expected distance between the two light beams on the image plane of said receiver means.

16. An apparatus for measuring the wall thickness of a transparent object comprising:

light source means for generating a beam of radiation;

projecting means for projecting a narrow beam of light onto an outer surface of a transparent object at an angle other than 90°;

receiving means for receiving beams of light which are formed by the reflection of the beam of light from a first boundary surface adjacent said outer surface and a second boundary surface which is spaced from the first boundary surface by the distance to be measured;

said receiving means also receiving a formation of images of the lines of intersection between the beam of light and the first and second boundary surfaces;

processing circuit means for determining the interval of time between output signals generated by said receiver means in response to the appearance of the two beams of light at a predetermined location on the receiver means, said processing circuit means including a comparator circuit;

wherein said receiver means further comprises;

two measuring surfaces, each surface including two separate spaced photocells, said photo cells being separated along a boundary line (G), said boundary line extending on the image plane of the receiver means transversely to the direction of movement of the beams of light whereby output signals measured from said two measuring surfaces are adapted to be compared by said comparator circuit of said processing circuit and wherein the wall thickness of the transparent object is determined by a determination of the interval of time from the output signal generated by the comparator at a first time to the output signal generated by the comparator at a second time;

said measuring surfaces being comprised of the entrance surfaces of optical prisms or mirrors which adjoin along a boundary line so that the light fluxes incident on said prisms or mirrors are directed by said prisms or mirrors onto said two separate photocells;

the beams of light received by said receiving means having curved cross-sections and wherein said boundary line (G) between said measuring surfaces has the same curvature as the light beams on the image plane of said receiver means.

17. Apparatus according to claim 16 wherein:

said receiver means is preceded in the light path by a slit stop, said slit stop having a slit, said slit having a preselected width so that said slit stop vignettes in the image plane of said receiver means an area which ahs a width that is smaller than the largest expected distance between the two light beams on the image plane of said receiver means.

* * * * *